Patented May 17, 1927.

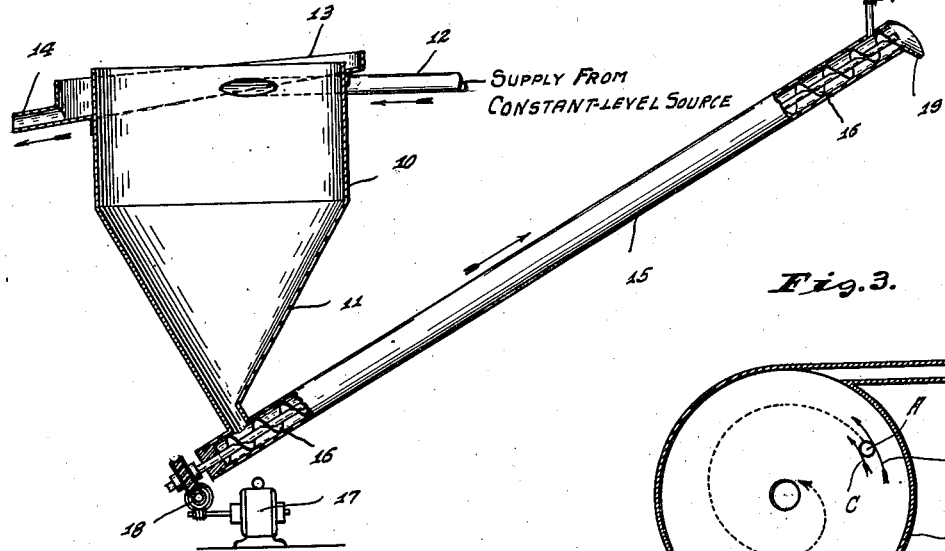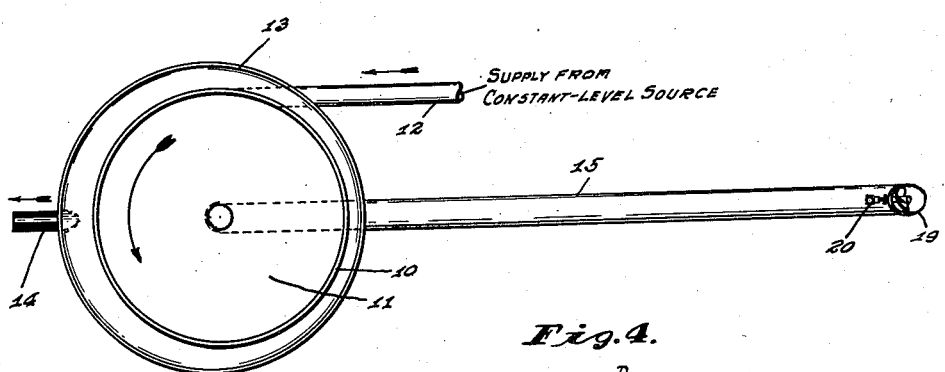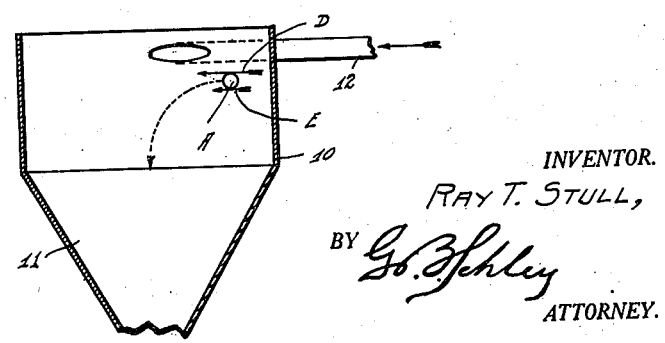

1,629,182

UNITED STATES PATENT OFFICE.

RAY T. STULL, OF COLUMBUS, OHIO, ASSIGNOR TO STULL PROCESS COMPANY, OF SAVANNAH, GEORGIA, A CORPORATION OF GEORGIA.

WHIRLPOOL CLASSIFIER AND CLASSIFYING PROCESS.

Application filed February 21, 1923. Serial No. 620,339.

It is the object of my invention to separate according to their size particles of which all are of such exceeding fineness that they pass through any practicable screen; and more particularly to separate particles of such fineness that they are colloidal or quasi-colloidal in character from the relatively much larger particles which are nevertheless too small to be caught on a practicable screen.

In "washing" or "purifying" clays used for pottery or for fillers, the crude clay as mined is blunged with an excess of water until the clay is thoroughly slaked or disintegrated, thus producing a slip of thin cream-like consistency which contains not only the particles of clay proper, but also the contaminating substances which occur in the natural clay, such as sand, mica, and grit. Sometimes the crude clay can be directly blunged, without preliminary treatment, while at other times the crude material must be preliminarily prepared for blunging, as by crushing or grinding, and screening, either wet or dry. The blunging operation with an excess of water or other suitable liquid separates the particles and places them in suspension in the water or other liquid.

The clay slip from the blunger has the larger particles removed therefrom, by first passing through a series of settling troughs in which the coarser particles settle by gravity, and then through one or more screens or sieves into a collecting tank; which thus contains a slip having in suspension only such particles as were too fine to be caught on the screen or sieve. The slip in this collecting tank has the water removed from it, as by pumping the slip into filter presses where the water is squeezed out and the solids recovered in the form of flat cakes. The solids thus recovered consist in the main of clay, but are contaminated by whatever impurities have succeeded in passing through the screen. The screens practicable for employment vary from 80-mesh to 120-mesh; and 120-mesh screens are about the finest that are practicable, because finer screens are too slow in screening, clog too easily, and wear out too rapidly, due to the fine brass wire of which they are woven, so that they are expensive both in maintenance and operation. Thus by far the greater part of any abrasive grit, sand, mica, or other objectionable impurities, the particles of which are smaller than 120-mesh size is present in the so-called purified clay.

So-called "pure" clay, or pure "kaolin", is composed of particles of hydrated aluminum silicate known as kaolinite, or substances similar to it. The clay particles themselves are most frequently colloidal or quasi-colloidal in character, because they are so exceeding fine. The very fine colloidal part of the clay is its most valuable constituent, since it imparts certain desirable properties, particularly plasticity, which permit the clay to be formed into desirable shapes for pottery and to be spread smoothly when used as fillers for oilcloth, paper, and other filled articles.

The so-called purified clay, however, as already stated, contains in addition to these colloidal particles of pure kaolinite other particles of relatively very coarse size, though too small to be caught by 120-mesh screen; and these relatively coarse particles are undesirable for certain qualities of pottery and of fillers.

By my present invention, I separate out these relatively coarse particles from the fine colloidal particles of pure clay; and do so without requiring so fine a screen, or even any screen at all if that is desired, and by a process which is much more rapid and much less expensive and less troublesome than screening; so that the solids subsequently recovered from the filter presses are much more nearly freed of clay-contaminating matter, if not completely so.

While my invention is particularly designed for purifying clay, by separating the colloidal or quasi-colloidal particles of clay from the finer contaminating particles, such as sand, mica, and grit, my invention is not at all limited to the purification of clay, but may be used for separating other mixed suspensions of relatively fine and relatively coarse particles, especially when the fine particles approach colloidal size. For instance, it may be used for de-sliming ores, in which the slime is of colloidal character. In this instance, the larger-particle part is the part which is desired to be retained, whereas in the purifying of clays it is the smaller-particle part which is desired and retained; but either part, or both, may be retained as desired, as my process consists fundamentally in their separation.

Perhaps the action is not dependent merely on the size of the particles, but involves other factors, such as some other properties of colloidal matter and its action in suspension; and perhaps also the separation is affected by specific gravities to a greater or less extent. However, whether or not these other factors come in, I find that I can get a separation substantially according to the size of the particles.

In carrying out my invention, I preferably make use of an apparatus substantially of the type shown in the accompanying drawing. In this drawing, Fig. 1 is a vertical central section of such apparatus; Fig. 2 is a plan thereof; Fig. 3 is a diagrammatic plan, showing diagrammatically a possible explanation of the centripetal action on the larger particles; and Fig. 4 is a diagrammatic elevation, showing diagrammatically a possible explanation of the downward-moving action on the larger particles.

In this apparatus, there is a hollow cylindrical vessel 10, preferably having a lower part 11 in the shape of a hollow inverted cone. A supply pipe 12 discharges tangentially into the vessel 10, close to the top thereof, and preferably receives its supply from a constant-pressure source, such as a constant-level tank. The material supplied through the pipe 12 is the mixed suspension, such as the clay slip above described, after it has passed through a screen of desired size. Because of the tangential discharge of the pipe 12 into the vessel 10, the clay slip in such vessel has a whirlpool motion, whirling within said vessel at a speed which can be controlled by the velocity of discharge from the supply pipe 12. A controlling trough or launder 13 surrounds the vessel 10 close to its top, in position to receive any overflow therefrom. This trough or launder preferably has a sloping bottom, as is clear from Fig. 1, and at its lowest part is provided with an out-flow spout 14 from which the overflow is discharged. The lower end of the inverted-cone bottom 11 opens downwardly into a tube 15, which preferably extends obliquely upward from this supply point to a point at least as high as the top of the vessel 10, to balance the hydrostatic pressure, though this is not essential. A screw or worm conveyor 16 is mounted within the tube 15 and is rotated in any suitable manner, as from an electric motor 17 operating it through a compound worm gearing 18. The upper end of the tube 15 preferably has a discharge spout 19, higher than the liquid level in the vessel 10 from which discharge spout the matter forced upward through such tube 15 by the screw 16 is discharged. Preferably, a water-supply pipe 20 discharges into the upper end of the tube 15, for supplying water to wash from the solids in the tube 15 any small-particle matter, such as colloidal matter, which may adhere thereto.

In operation, the clay slip or other mixed suspension to be separated is discharged under pressure, preferably constant pressure, through the supply pipe 12 tangentially into the vessel 10, to produce a whirlpool motion within such vessel 10, as already described. The whirling motion of the mixed suspension causes the coarser particles therein to move toward the center and downward, the downward force undoubtedly being assisted by gravity to some extent. The finer particles, such as the colloidal or quasi-colloidal clay particles, remain in suspension in the liquid, and do not move with the coarser particles toward the center, but instead are carried over the upper edge of the vessel 10 with the liquid as the continued supply of the mixed suspension causes an overflow, the upper edge of the vessel constituting a wier. In other words, the small colloidal particles float with the liquid out over the top of the vessel 10 into the collecting trough 13, whence they are discharged into any desired container through the spout 14; while the coarser particles pass down through the vessel 10 and its inverted cone 11 into the tube 15, along which they are carried by the screw 16 to the top of the tube 15 and there discharged by the spout 19. The clear water admitted by the pipe 20 washes from this larger-particle mass of solids in the tube 15 any finer-particle matter which may have adhered thereto, so that the matter discharged from the spout 19 is substantially free from the particles of fine size. The inverted-cone bottom 11 appears to facilitate the separation of the larger and finer particles, but it is not essential; and neither is the screw conveyor 15—16 necessary for carrying off the larger-particle solid matter.

I do not undertake to explain fully the theory of operation of the apparatus I have shown. There is from some cause a centripetal force which acts on the larger particles of suspended solid matter to carry them toward the center, and also a force which acts on such larger particles to carry them downward; but these centripetal and downward forces are not effective to carry the smaller suspended particles to the center and downward.

Perhaps these centripetal and downward forces are explainable by the diagrams of Figs. 3 and 4. As the stream of material enters the vessel 10 from the supplying pipe 12, and rotates within the vessel 10, there are apparently successive rings of rotating matter from the circumference to the center, which rings toward the center rotate with a smaller angular velocity than the rings toward the circumference, as is indicated by the length of the arrows B and C in Fig. 3. In the same way, there are apparently successive layers of rotating matter, one above another, with the upper layers rotating more rapidly than the lower layers, as indicated by the arrows D and E in Fig. 4.

With these conditions, consider a particle A, viewed from the top as in Fig. 3. At its point nearest the circumference, this particle A is in contact with a more rapidly rotating ring of liquid, while at a point nearest the center it is in contact with a less rapidly rotating ring of liquid. This differential speed of rotation causes the particle A to roll on itself, which rolling results in a movement of the particle A toward the center as indicated by the dotted line in Fig. 3. In substantially the same way, if viewed from the side, the particle A is in contact at its uppermost point with a more rapidly moving layer of liquid than it is at its lowermost point, which similarly causes the particle to roll on itself about a horizontal axis; which rolling causes the particle A to travel downward. As a result, the particle A travels both toward the center and downward.

As the size of the particle A decreases, the differential between the velocities acting on its diametrically opposite points decreases, until finally a point is reached where this differential is ineffective to produce the movement; and particles below that size remain in suspension and pass out with the liquid over the edge of the vessel 10. This effect may be at least partly due to the fact that the ratio of the surface to the volume of a particle increases as the volume of the particle decreases, and this relative increase in surface upon decrease in volume effects the retention of the particle in suspension, and prevents the aforesaid centripetal and downward forces from moving it centrally inward and downward in the whirling mass.

I do not give this theory as completely explaining the action; for it may not be the explanation, though I think it is. Whether or not this explanation is correct, the action of separation according to size does take place as stated.

This separation in the case of clay is largely if not wholly independent of variations in centrifugal force and specific gravity, so far as I have been able to discover, as the specific gravities of all the minerals found in the usual natural clays, such as kaolinite, feldspar, mica, and silica sand, are very close together, all lying very close to 2.50.

I claim as my invention:

1. The process of separating colloidal or quasi-colloidal particles from fine granular particles, consisting in delivering a mixture of such particles suspended in liquid tangentially to the outer portion of a horizontally extended internally unobstructed body of liquid under impetus sufficient to establish a horizontal whirl having an angular velocity which decreases toward the center, overflowing a thin sheet of liquid carrying the quasi-colloidal particles from the periphery of the liquid body above but close to the level of the feed, and collecting the granular particles below the feed region.

2. The process of separating relatively coarse and fine particles of small size, comprising suspending such mixed particles in a liquid, whirling the resultant suspension while maintaining a relatively extended free unobstructed upper surface with the angular velocity of rotation lower near the center of the whirling mass than it is near the circumference and lower near the bottom than it is near the top, to cause the coarse particles to seek the center and descend, withdrawing the collected coarser particles from the center, and withdrawing the liquid with the fine particles still suspended therein by overflow at the circumference.

3. The process of separating relatively coarse and fine particles of small size as set forth in claim 2, with the added step of supplying additional suspension tangentially near the top of the whirling mass to take the place of that withdrawn at the circumference.

4. The process of separating coarse and fine particles of small size, comprising discharging tangentially into a mass having a free unobstructed upper surface, near the top and outer edge thereof, a mixture of such particles suspended in liquid to produce in the mass a whirling of such suspension to cause the coarser particles to seek the center and descend, withdrawing the coarser particles from the lower portion, and withdrawing the liquid with the fine particles still suspended therein by peripheral overflow.

5. The method of separating mixed colloidal and non-colloidal matter, comprising whirling a liquid having a relatively extended free unobstructed upper surface in which liquid such mixture is suspended to cause the non-colloidal matter to seek the center, withdrawing the collected non-colloidal matter from the center of the whirling liquid, and withdrawing liquid containing colloidal matter still suspended in it from the whirling mass at the circumference thereof near the top.

6. The method of separating mixed colloidal and non-colloidal matter, comprising whirling a liquid in which such mixture is suspended to cause the non-colloidal matter to seek the center, withdrawing the collected non-colloidal matter from the center of the whirling liquid, withdrawing liquid containing colloidal matter still suspended in it from the whirling mass at the circumference thereof near the top, and supplying additional suspension tangentially near the top of the whirling mass to take the place of that withdrawn at the circumference.

7. A separator for colloidal or quasi-colloidal particles and fine granular particles, comprising a horizontally extended internally unobstructed vessel, means for feeding a mixture of such quasi-colloidal particles and fine granular particles tangentially into a restricted peripheral portion of the vessel under impetus sufficient to establish in the vessel a horizontal whirl having an angular velocity which decreases toward the center, said receptacle being provided with a horizontally extended peripheral overflow above but close to the region of feed, and also being provided with means below the feed region for collecting the granular particles.

8. A separator for colloidal or quasi-colloidal particles and fine granular particles, comprising a horizontally extended internally unobstructed vessel, means for feeding a mixture of such quasi-colloidal particles and fine granular particles tangentially into the vessel under impetus sufficient to establish in the vessel a horizontal whirl having an angular velocity which decreases toward the center, said receptacle being provided with a horizontally extended peripheral overflow above but close to the region of feed, and also being provided with means below the feed region for collecting the granular particles.

9. A separator for separating coarse and fine particles of small size, comprising an open vessel of extended horizontal cross-section and internally unobstructed, an inflow pipe discharging tangentially into said vessel near the top thereof but below the same for supplying thereto a mixed suspension in liquid of such coarse and fine particles, said vessel being arranged to hold such suspension with a free surface and to permit free radial movement of said suspension, and an outflow pipe from the center of the vessel below the level of said inflow pipe for carrying off the coarse particles, said vessel having a peripheral overflow at a point at least as high as the level of said inflow pipe.

In witness whereof, I have hereunto set my hand at Indianapolis, Indiana, this second day of February, A. D. one thousand nine hundred and twenty three.

RAY T. STULL.